Sept. 14, 1965 W. VAUGHAN ETAL 3,206,607

REFLECTING APPARATUS FOR CHARACTER RECOGNITION SYSTEM

Filed Sept. 12, 1961 3 Sheets-Sheet 1

INVENTORS
WILLIAM VAUGHAN
JOHN A. FITZMAURICE
BY Morse + Altman
ATTORNEYS

INVENTORS
WILLIAM VAUGHAN
JOHN A. FITZMAURICE
BY Morse + Altman
ATTORNEYS

REFLECTING APPARATUS FOR CHARACTER RECOGNITION SYSTEM

Filed Sept. 12, 1961 3 Sheets-Sheet 3

INVENTORS
WILLIAM VAUGHAN
JOHN A. FITZMAURICE
BY Morse + Altman
ATTORNEYS 3,206,607
REFLECTING APPARATUS FOR CHARACTER RECOGNITION SYSTEM William Vaughan, Weston, and John A. Fitzmaurice, Arlington, Mass., assignors to Baird-Atomic, Inc., Cambridge, Mass., a corporation of Massachusetts Filed Sept. 12, 1961, Ser. No. 137,558
9 Claims. (Cl. 250—220)

This invention relates in general to electro-optical character recognition systems and more particularly concerns a novel reflecting apparatus for positioning a multiplicity of projected images separately and simultaneously against an array of photo-responsive elements.

In automatic electro-optical print readers such as disclosed in U.S. Patent No. 2,933,246 and in a co-pending application, Serial No. 25,659, filed April 29, 1960, now Patent No. 3,124,636, entitled "Character Recognition Device," unknown alpha-numeric characters are recognized by matching the unknown characters with an array of known characters. In practice, this may be carried out by optically projecting the unknown character through a transparency which carries an array of known reference characters and against an array of photo detectors. The resulting electric signals generated by the photo detectors thereby bear a special, predetermined correlation to the unknown reference character.

Normally, for projection systems of this sort, a rather large amount of space is required to obtain complete coverage of the array of photo detectors. Also considerable care must be taken in aligning the various elements to insure that the light beams from all projected characters are positioned directly on the center of their corresponding photo detectors. Accordingly, it is a general object of the present invention to reduce the overall size of electro-optical character recognition devices.

Another object of this invention is to provide a novel reflecting apparatus for separately positioning each of a multiplicity of projected characters against a corresponding photo-detector in an array of photo-detectors.

Yet another object of this invention is to provide means for reducing the amount of stray light in an electro-optical character recognition device.

More particularly, this invention features a character recognition system in which projected intelligence symbols are reflected through a 180 degree change of direction against an array of photo-detectors. The reflecting apparatus featured in this invention includes a supporting plate for an array of individually mounted and individually adjustable mirrors. One mirror is provided for each reference character and is adapted to reflect the projected light beam against a corresponding photo-detector. The unused space between adjacent characters is eliminated since only the character itself and its immediate background are reflected against the detector. With this arrangement, the photo-detectors may be grouped closely together to reduce the size of the projection area. Moreover, the light beam coming from the image of each character may be individually and precisely centered and locked on its respective photo-detector.

But these and other features of the invention, along with further objects and advantages thereof, will become more readily apparent from the following detailed description with reference being made to the accompanying drawings in which.

Figure 1:
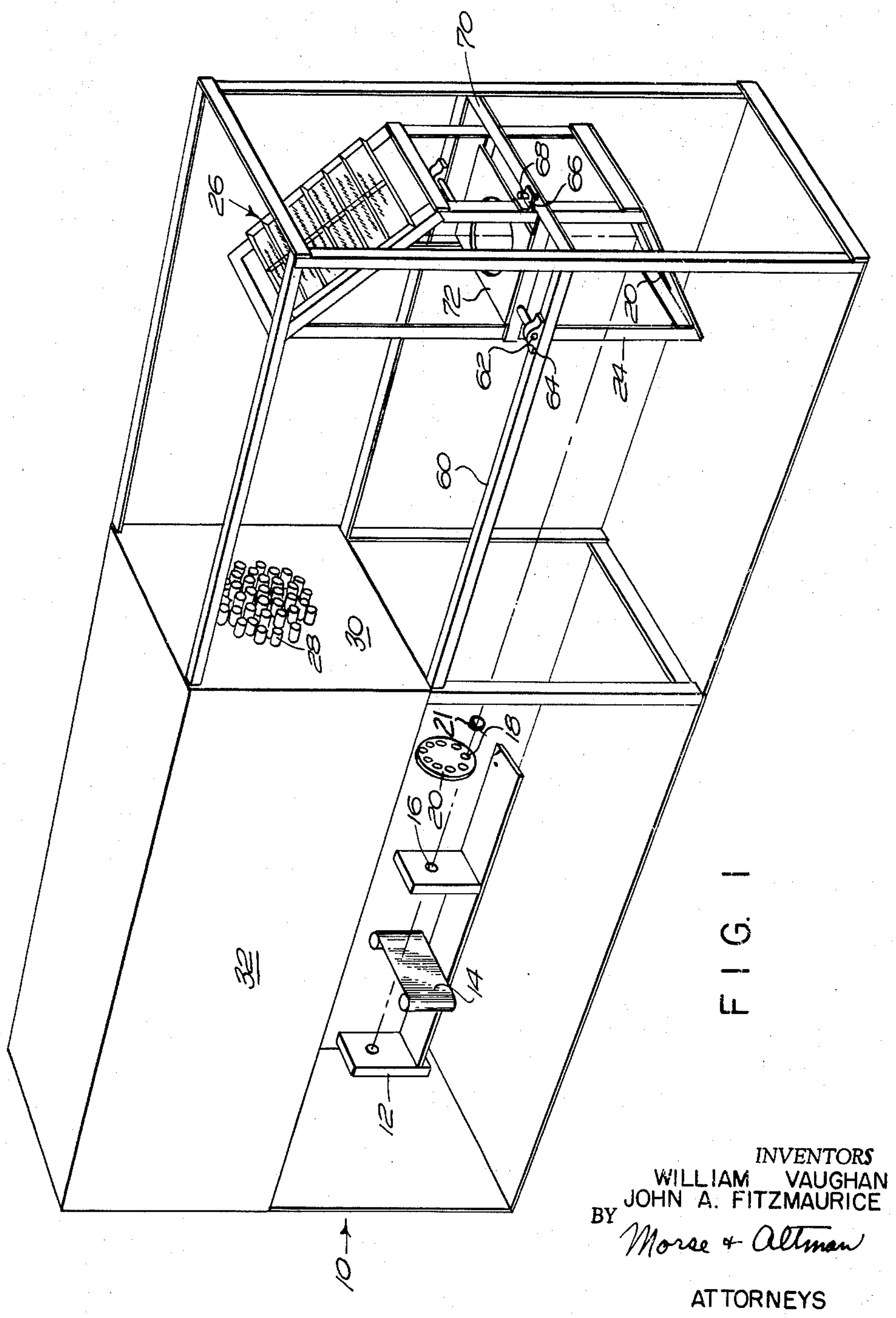
FIG. 1 is a view in perspective of an electro-optical character recognition system employing a reflecting apparatus made according to the invention.

Referring now to the drawings, the reference character 10 generally indicates a framed cabinet for housing an electro-optical character recognition system. The system includes a light source 12 adapted to illuminate and project the image of an unknown intelligence symbol appearing on a transparent film 14 which is mounted in a suitable holder along the axis of the light beam.

A multiple lens system 16 picks up the image of the single unknown character and multiplies it into an array of separate images, all of which are projected against a matrix 18 on which there appears an array of known reference characters. The matrix 18 may be any one of several matrices mounted about the periphery of a rotatable disc 20, as disclosed in a co-pending application Serial No. 104,954, filed April 24, 1961, and entitled "Reference Symbol Changer for Character Recognition Device."

The disc 20 is arranged to carry a plurality of matrices, each bearing an array of known reference characters, with each array differing from one another only as to type font. With means for automatically indexing a particular array into position, the system is able to identify a wider range of unknown reference characters than would be the case if characters of only one particular type font could be identified.

From the reference array on the matrix, the individual light beams from the superimposed images are projected by a field lens 21 against a flat first surface mirror 22 mounted at a 45 degree angle to the light path in the lower portion of a cage 24. From the mirror 22 the beams are directed vertically upward against a multi-mirror reflecting device 26 which is oriented generally at a 45 degree angle to the light path and mounted in the top portion of the cage 24. From the reflecting device 26 the several beams are directed along a path parallel and reverse to its original path and against an array of photo tubes 28. The array of photo tubes 28 is mounted on an end panel 30 which forms part of a cabinet section 32 for housing various electronic components which translate the output of the photo tube array into useable signals.

Figure 2:
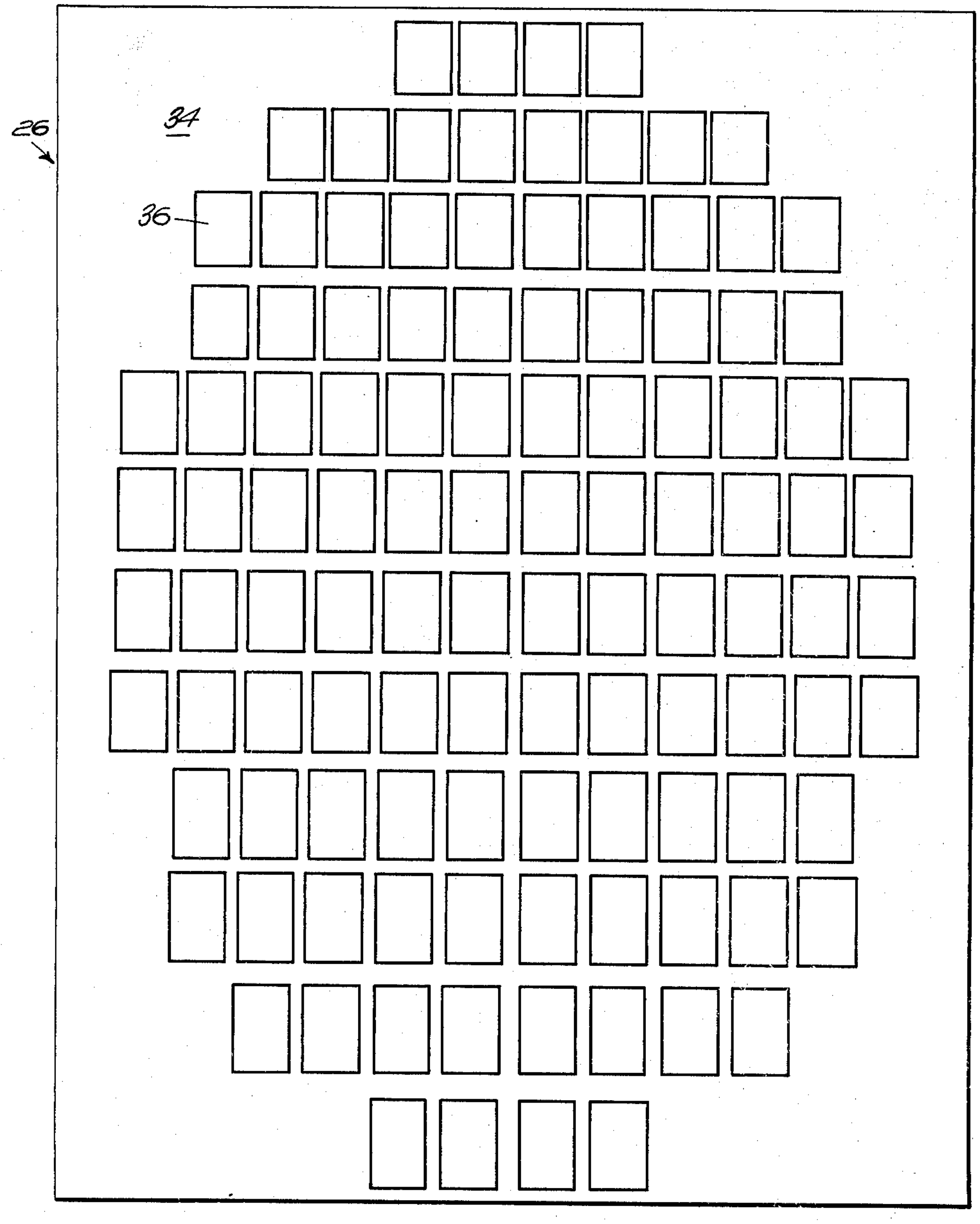
FIG. 2 is a front elevation of a mirror array made in accordance with the invention.
Figure 3:
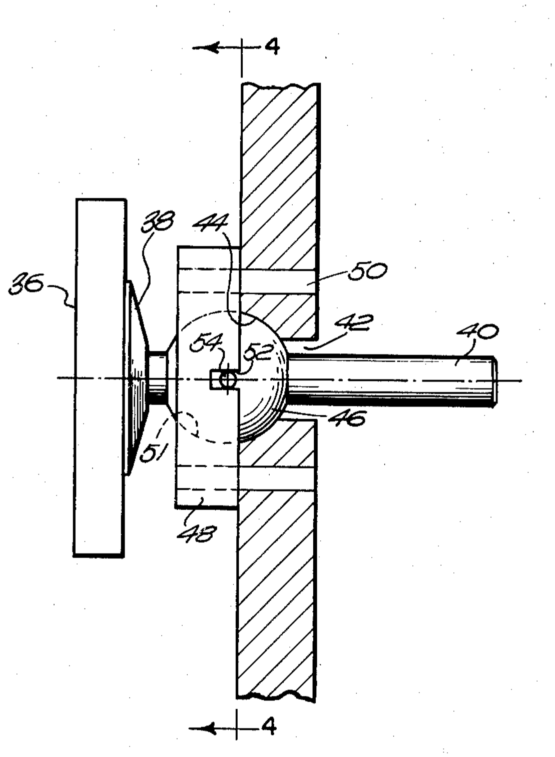
FIG. 3 is a detail view in side elevation partly in section showing an individual mirror assembly.
Figure 4:
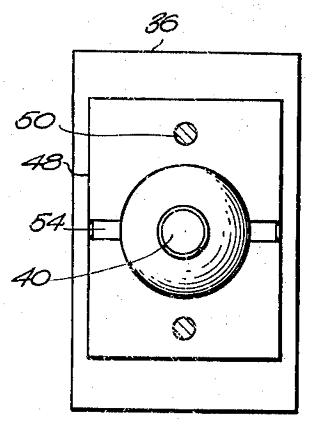
FIG. 4 is a cross sectional view taken along the line 4—4 of FIG. 3.

Referring now more particularly to the reflecting device 26, it will be noted from FIGS. 2–4 that the device comprises a rectangular, flat, rigid plate 34 which supports an array of individually mounted first surface mirrors 36, Each mirror presents a rectangular, reflecting surface aluminized and overcoated with silicon monoxide, and is mounted, as by cement, to a disk 38 fastened to one end of a cylindrical shaft 40. The shaft 40, as best seen in FIG. 3, extends through an enlarged opening 42 formed in the plate 34. In the front wall of the plate, the opening 42 merges into a spherical seat 44 for mating engagement with a balled bushing 46 press fitted to the shaft 40. A rectangular retaining member 48 is formed with a spherical opening 51 through its center for mating engagement with that portion of the bushing 46 not received by the seat 44. The retaining member 48 is secured to the plate 34 by means of screws 50 which pass through the plate 34 into threaded engagement with the member 48. For easy access in adjusting the position of the mirror, the heads of the screws 50 should be located at the back side of the plate 34.

The retaining member 48 is formed with a pair of horizontal channels 52 radial to and in communication with the spherical recess 51. These channels loosely accommodate a pair of pins 54 extending from opposite sides of the bushing 46. It will be readily understood that with this arrangement, the mirror may be angularly adjusted by loosening the screws 50 sufficiently to relieve the clamping pressure of the member 48 against the bushing 46. The shaft 40 may then be grasped and pivoted in any direction within the limits permitted by the gap between the shaft 40 and the opening 42, and also by the amount of play between the pins 54 and the channels 52.

The purpose of this adjustable mounting is to permit individual positioning of each projected light beam against a corresponding photo detector. For proper operation of the photo detector it is critical that each of the projected beams be precisely centered on the face of a corresponding tube 28. It will be appreciated that without such device it would be extremely difficult to assemble the system so that the beam from each character would fall exactly upon the center of its respective tube. Since the images may be projected 20 feet or more, any slight misalignment would become exagerated over the range of projection. Now, however, any misalignment may be easily corrected after the apparatus is fully assembled merely by manipulating the mirrors 36, as necessary, until all of the images are properly centered.

Both the plate 26 and the mirror 22, as shown in FIG. 1, are mounted on the cage 24 which is pivotally mounted to horizontal frame members 60 by means of trunnions 62 extending from opposite sides of the cage and engaging bearing blocks 64. On the rear of the cage 24 there is located a pad 66 which carries an adjusting screw 68. The cage is mounted slightly off balance so as to provide a clockwise moment (as viewed in FIG. 1) about its bearings. This, of course, causes the lower end of the adjusting screw to bear against the top surface of a horizontal cross bar 70 which forms part of the cabinet frame. It will be readily understood that adjustment of the screw 68 will pivot the cage clockwise or counterclockwise about its bearings to bring the reflecting elements into general angular alignment with the light source and the photo tube array. Once the proper position on the cage is established the individual mirrors 36 may be adjusted as necessary.

In addition to the plate 26 and the mirror 20, the cage 24 also supports an apertured diaphragm 72 to prevent stray light from striking the reflecting device 26.

Referring now to FIG. 2, it will be seen that the individual mirrors 36 are arranged into a group that roughly resembles an oval. The mirrors are also arranged in horizontal rows and substantially vertical columns with the number of mirrors in a particular row or column being established according to the arrangement of the known reference characters appearing on the matrix 18. In the matrix the reference characters are grouped generally within a circular area and arranged symmetrically in intersecting evenly spaced horizontal rows and vertical columns. Typically, the four inner columns and the four inner rows each consist of twelve reference characters, while the outer columns, and rows have a decreasingly lesser number of characters with the outermost rows and columns having but four characters apiece.

Since the array of reference characters will be reflected through a 180 degree change of direction, a certain amount of distortion of the array is involved on the reflecting surfaces. It will be observed from FIG. 1 that the angle of incidence for both the lower mirror 22 and the reflecting device 26 is approximately 45 degrees. As a result the projected circular array 18 will appear as an oval on the reflecting surfaces. In order to compensate for this distortion, the mirrors 36 on the plate 26 must also be arranged in an oval. Furthermore, the angle of incidence will be exactly 45 degrees only across the horizontal centerline and the angle will decrease below the centerline and increase above it. For this reason, the projected characters will be rather closely spaced at the lower portion of the plate where the angle of incidence is the least and will gradually spread apart towards the top of the plate where the angle of incidence is at a maximum. Also the light beams themselves will be vertically elongated with the uppermost beams being elongated more than the lowermost characters.

Following the pattern of projection, the mirrors 36 are arranged in an oval and gradually spreading apart from bottom to top. Also, it will be noted that the length of the mirrors gradually increases over the length of the plate. The configuration on the plate shows the several rows of mirrors appearing in horizontal alignment with spacing between rows gradually increasing. The vertical columns appear somewhat distorted by reason of the gradual increases in spacings between adjacent mirrors.

In any event, the resulting projected pattern appearing on the panel 30 is circular with the enlarged characters appearing evenly spaced and in uniform array. Accordingly, the photo tubes 28 are also symmetrically arranged in a circular pattern with each tube located in the path of projection of one of the light beams and in diagonal alignment with one of the mirrors 36.

By providing a reflecting device of this sort rather than a single large mirror, it is possible to eliminate the waste space between adjacent characters. Since this space normally increases with projection of the characters, it will be appreciated that a marked reduction in the overall size of the apparatus is achieved. Of equal significance is the fact that each character beam may be individually positioned on its proper photo tube to insure quick and convenient alignment of the system after assembly.

While the invention has been described with particular reference to the illustrated embodiment, it will be understood that numerous modifications will appear to those skilled in the art without departing from the invention.

Having thus described the invention, what we claim and desire to obtain by Letters Patent of the United States is:

1. An electro-optical system for recognizing unknown intelligence symbols, comprising a transparent matrix bearing an array of known reference characters, a light source and a lens system adapted to project one of said symbols against each of said characters, optical means including a plurality of substantially co-planar reflecting elements, means for individually adjustably mounting each element on a planar support for reflecting the combined projected images through a change of direction and an array of photo-responsive elements mounted in the reflected path of said images and adapted to produce a signal representative of the unknown symbol.

2. The electro optical system as defined by claim 1 in which said means for individually adjustably mounting each element includes a rectangular plate, a plurality of openings extending through said plate from front to back, a shaft extending through each of said openings, a balled bushing mounted on each of said shafts, each of said openings forming into spherical recesses adapted to receive a portion of said bushing, a retainer member having a spherical opening formed therein for mating engagement over said bushing and against said plate, screws passing through said plate into threaded engagement with said member for locking said shaft in a selected angular position, and a flat first surface mirror mounted on one end of each of said shafts, said mirrors being substantially coplanar with one another and arranged in substantially horizontal rows and substantially vertical columns within a substantially ellipsoidal area.

3. The electro optical system as defined by claim 1 wherein the optical means includes a flat supporting plate, a plurality of openings extending through said plate, a shaft extending through each of said openings, means for mounting each of said shafts for limited angular movement relative to said plate, means for locking said shaft in a selected angular position, and a flat first surface mirror mounted on one end of each of said shafts, said mirrors having their reflecting surfaces disposed in substantially the same plane, and being arranged in substantially horizontal rows and substantially vertical colunms within a substantially ellipsoidal area.

4. The electro optical system as defined by claim 1 in which said means for individually adjustably mounting each element includes a flat plate, a plurality of openings extending through said plate, a shaft extending through each of said openings, means for mounting each of said shafts for limited angular adjustment relative to said plate, means for locking said shaft in a selected angular position, and a flat reflector mounted on one end of each of said shafts, all of said reflectors lying in substantially the same plane.

5. The electro optical system as defined by claim 1 in which said optical means includes a supporting member, a plurality of reflecting elements mounted substantially co-planar to one another on said member, said elements being mounted for individual angular adjustment, and means for locking each of said elements in a selected angular position, said elements being arranged in substantially horizontal rows and substantially vertical columns within a substantially ellipsoidal area.

6. A reflecting apparatus according to claim 5, wherein said elements are separated from one another by a distance which gradually increases from the lower portion of the member to the upper portion of the member.

7. An electro-optical system for identifying unknown intelligence symbols, comprising a matrix bearing an array of known reference characters, a light source and a lens system adapted to project said symbol against each of said characters, individual reflecting elements mounted on a planar support each angularly adjustable for reflecting the light from the superimposed projected images through a 180° change of direction and an array of photo-responsive elements mounted in the reflected path of said images and adapted to produce a signal representative of the unknown symbol.

8. An electro-optical system according to claim 7, including a support for said reflecting elements, said support being adjustably mounted for moving said reflecting elements in unison about an axis normal to the path of projection.

9. An electro-optical system according to claim 1 including means mounting said optical means for angularly adjusting all of said reflecting elements in unison relative to said photo-responsive elements.

References Cited by the Examiner

UNITED STATES PATENTS

| | | | |
|---|---|---|---|
| 1,190,050 | 7/16 | Verba | 88—84 |
| 2,172,330 | 9/39 | Bryce | 250—219 |
| 2,211,320 | 8/40 | Efron | 250—219 |
| 2,987,961 | 6/61 | Cotten et al. | 88—84 |

RALPH G. NILSON, *Primary Examiner.*

WALTER STOLWEIN, *Examiner.*